June 18, 1935.  A. G. BLODGETT  2,005,644
FUEL BURNING APPARATUS
Filed Aug. 29, 1934    2 Sheets-Sheet 1

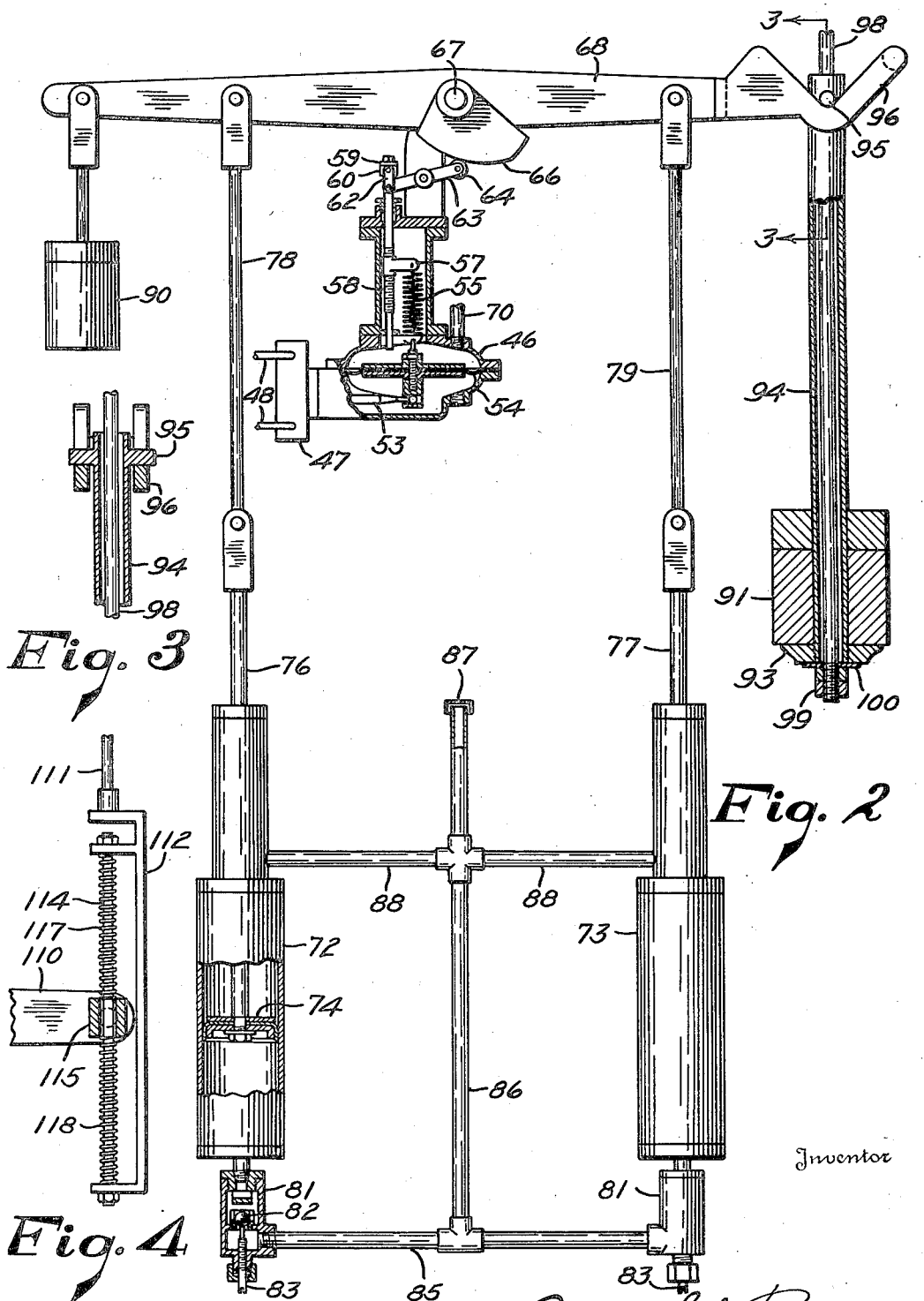

Patented June 18, 1935

2,005,644

UNITED STATES PATENT OFFICE 2,005,644

FUEL BURNING APPARATUS

Albert G. Blodgett, Worcester, Mass., assignor to Riley Stoker Corporation, Worcester, Mass., a corporation of Massachusetts Application August 29, 1934, Serial No. 741,969

17 Claims. (Cl. 236—26)

This invention relates to fuel burning apparatus, and more particularly to apparatus for burning pulverized fuel and controlling the combustion thereof automatically.

In the direct fired system of burning pulverized fuel the coarse fuel, such as coal, is supplied to a pulverizer by means of a suitable feeding device. After pulverization the fuel is transported directly to the furnace burner by means of a current of so-called primary air. The additional or secondary air required to complete the combustion is usually supplied at the furnace. The rate of combustion is controlled by varying both the supply of coarse fuel to the pulverizer and the supply of secondary air to the furnace. It is of the utmost importance to maintain the correct ratio between the fuel and air quantities at the furnace, not only during steady loads but also during changes in load.

It has been found that in a system of this type if the rate of feed of coarse fuel to the pulverizer is changed, the rate of pulverized fuel flow at the burner will change at a slower rate, apparently as a result of pulverizer characteristics. Hence if the air flow is changed simultaneously and at the same comparative rate as the coarse fuel feed, the correct fuel-air ratio will not be maintained at the furnace during load changes. This problem has been recognized, and it has been proposed heretofore to adjust the air flow at a slower rate than the coarse fuel feed. In the carrying out of this prior proposal, a supply of air has been maintained at constant pressure under automatic control, and the flow of air from this supply to the burner has been controlled by a compensating-type regulator. A second compensating-type regulator responds to changes in the demand for heat and controls both the first mentioned regulator and the rate of supply of coarse fuel to the pulverizer. The first mentioned regulator operates at a slower speed than the second, thus producing the desired results.

This prior fuel burning system makes possible more accurate regulation and more efficient combustion of pulverized fuel than has been obtainable heretofore, but it nevertheless has certain disadvantages. The system is expensive, since it requires two regulators of the compensating type, in addition to an air pressure regulator and a furnace pressure regulator. The maintenance of a constant pressure air supply requires the expenditure of unnecessary power in the driving of the fan. Moreover, the system is not well adapted to a centralized arrangement of the regulators, since the motor of a compensating-type regulator must be located close to its control element, whereas the dampers or other devices to be actuated may be scattered widely about the plant.

It is accordingly the main object of the present invention to overcome these difficulties, and to provide apparatus for burning pulverized fuel which is so constructed and arranged that it will automatically maintain the correct fuel-air ratio at the furnace at all times, and particularly to provide apparatus of this type which will be comparatively simple and inexpensive to manufacture and install, economical in the use of power for forced draft, and adapted to a convenient and compact arrangement of the regulators.

It is a further object of the invention to provide automatic control apparatus for a direct-fired pulverized-fuel burning system which can be easily and accurately adjusted to meet the particular conditions encountered at various installations.

With these and other objects in view, as will be apparent to those skilled in the art, the invention resides in the combination of parts set forth in the specification and covered by the claims appended hereto.

In accordance with the preferred form of my invention I provide a master regulator which responds to changes in the demand for heat, as indicated for example by the steam pressure in the boiler being fired. This regulator is preferably of the compensating type. I also provide a second regulator, preferably of the non-compensating type, which controls the rate of air flow to the furnace and which responds to the slightest change in said air flow, as indicated for example by the pressure of the air anterior to the burner. The steam pressure regulator controls the rate of feed of coarse fuel to the pulverizer and also serves to readjust the air flow regulator as the demand for heat varies. This readjustment, however, is made at a slow rate as compared to the movement of the steam pressure regulator, so that the air flow will change at substantially the same rate as the fuel flow at the burner, thus maintaining the correct fuel-air ratio throughout each load change. In the preferred construction, yieldable means is provided to move the adjusting device into a predetermined position relative to the steam pressure regulator following each load change, the movements of the adjusting device being retarded by suitable means such as a dash-pot.

Referring to the drawings illustrating one embodiment of the invention, and in which like reference numerals indicate like parts, Fig. 1 is an elevation of a steam boiler furnace fired with pulverized fuel and arranged for automatic control of combustion;

Fig. 2 is an enlarged view of a portion of the combustion control apparatus, certain parts being shown in section for clearness of illustration;

Fig. 3 is a section on the line 3—3 of Fig. 2; and

Fig. 4 is a detail of a modified construction.

Figure 1:
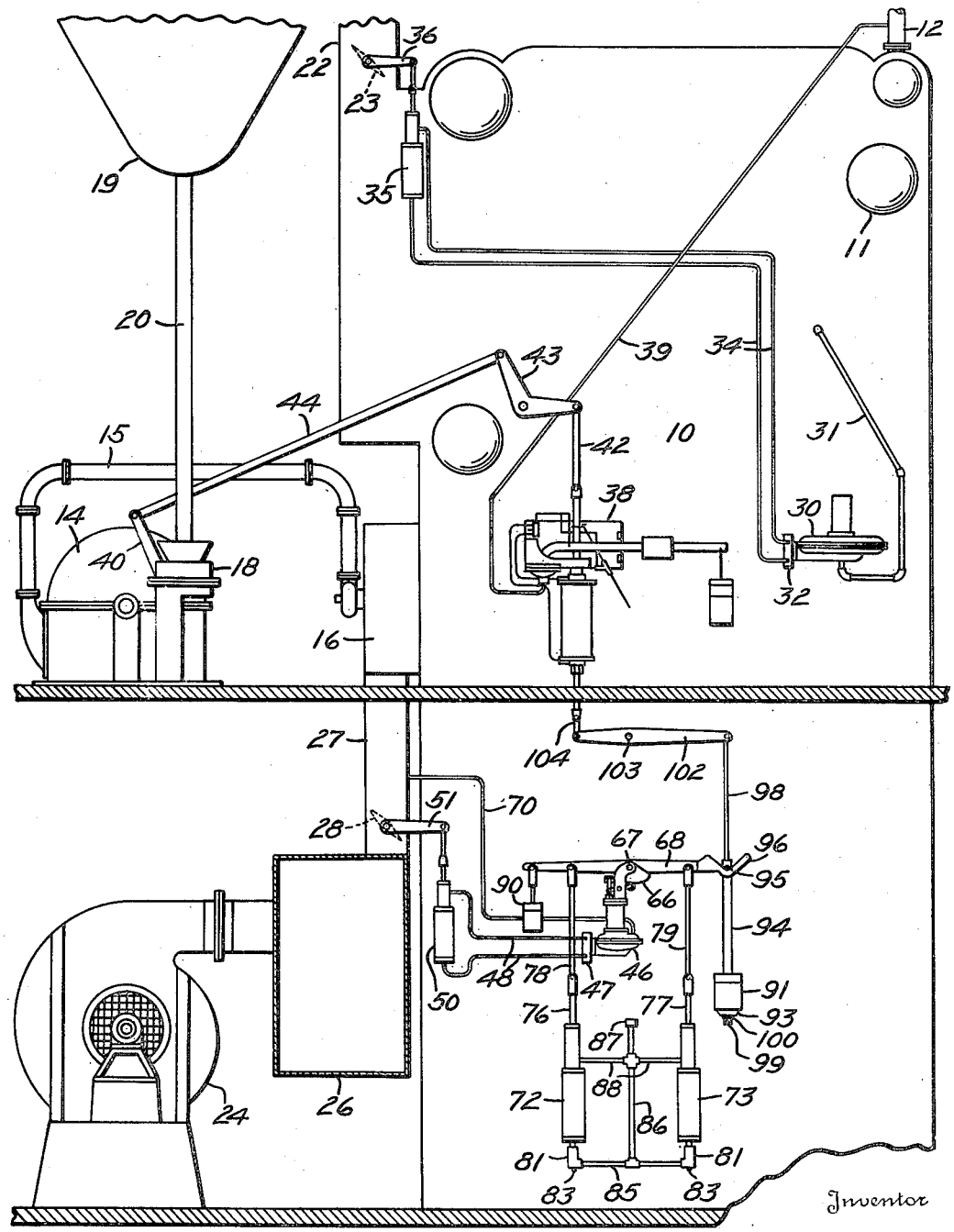

The embodiment illustrated comprises a furnace 10 associated with a steam boiler 11 having a steam discharge pipe 12. The furnace is fired with pulverized fuel by means of a unit-type pulverizer 14 having its discharge connected by a pipe 15 to a suitable burner 16. A regulatable feeding device 18 delivers coarse fuel to the pulverizer, the fuel being supplied to the feeding device from a bunker 19 through a spout 20. The gaseous products of combustion after leaving the furnace flow into contact with the heating surfaces of the boiler and then escape through an uptake or gas outlet 22 provided with a damper 23. The uptake 22 leads to a stack (not shown). The secondary air required for combustion of the fuel is supplied by one or more fans 24 which discharge into a main duct 26. The air is delivered from the main duct to the furnace burner 16 through a branch duct 27, and the rate of air flow to the burner is controlled by a suitable regulatable device, such as a damper 28 in the branch duct.

The gas pressure within the furnace is preferably maintained substantially constant at a value slightly below atmospheric pressure. For this purpose there is shown a regulator 30 connected with the interior of the furnace by a pipe 31. This regulator is of the type shown in the application of Paul C. Temple, Serial No. 646,835, filed December 12, 1932, and comprises a pilot valve mechanism 32 connected by pipes 34 with a hydraulic motor 35 which serves to actuate the operating arm 36 of the uptake damper 23.

The feed of coarse fuel to the pulverizer 14 is controlled automatically in accordance with the demand for heat, and as an indication of the demand I prefer to use the pressure of the steam. The desired fuel-feed control may be obtained by a master regulator 38 of the compensating type, one suitable construction being disclosed in the patent to Paul C. Temple No. 1,890,472, granted December 13, 1932. The steam pressure is transmittted to the regulator from the pipe 12 through a pipe 39. The regulator is connected to the arm 40 of the feeding device 18 by means of a link 42, a bell-crank 43, and a rod 44.

The flow of secondary air to the furnace is controlled by a regulator 46, which is preferably of the type shown in the application of Paul C. Temple, Serial No. 646,835, filed December 12, 1932. This regulator comprises a pilot valve mechanism 47 connected by pipes 48 with a hydraulic motor 50 which serves to actuate the operating arm 51 of the secondary air damper 28. The pilot valve mechanism 47 is actuated by a lever 53 (Fig. 2) which is controlled by a flexible pressure-responsive diaphragm 54 loaded by means of a tension spring 55. The spring 55 is connected at its upper end to a nut 57 supported on a vertically slidable screw 58. The upper end of the screw 58 is provided with a flange 59 which rests on a collar 60, this collar being connected by links 62 to a pivotally mounted lever 63 having a cam roller 64 on one end. The roller 64 engages a cam 66 mounted on a shaft 67 to which is secured an operating lever 68. It will be apparent that as the cam 66 is turned by means of the lever 68, the screw 58 will be moved vertically, thus changing the tension of the spring 55. The spring tension can also be adjusted by rotating the screw 58 manually, thus raising or lowering the nut 57.

The diaphragm 54 is supported against the loading of the spring 55 by means of a force which is a function of the rate of secondary air flow. For this purpose I preferably utilize the pressure of the air anterior to the burner 16, this pressure being brought to the regulator through a pipe 70 connected to the branch duct 27. With this construction it will be apparent that the regulator 46 will respond rapidly to the slightest change in air flow in the branch duct, as indicated by the air pressure, and will actuate the motor 50 and damper 28 whenever necessary to maintain the air flow substantially constant. The rate of air flow to be maintained will be dependent upon the tension of the spring 55.

In order that the rate of air flow may be varied with changes in the demand for heat, so that the fuel-air ratio may be held substantially constant, I provide means whereby movements of the steam pressure regulator 38 will vary the position of the lever 68 and thus change the force exerted by the spring 55 on the diaphragm 54. Each movement of the regulator 38 also effects an adjustment of the fuel feeding device 18, but the resulting change in fuel flow at the burner takes place at a slower rate. This phenomenon tends to vary the fuel-air ratio during load changes, and I avoid such variations by providing means for adjusting the lever 68 at a slower rate than the corresponding movements of the steam pressure regulator. For this purpose I prefer to utilize a suitable retarding device for the lever 68, the latter being actuated by the steam pressure regulator through a lost motion connection. A yieldable device is provided to move the lever gradually to a predetermined position relative to the steam pressure regulator following each load change.

In the embodiment illustrated the movements of the lever 68 are retarded by two hydraulic dash-pots 72 and 73 each of which comprises a vertical cylinder having a slidable piston therein and filled with a suitable liquid, such as oil. The dash-pot 72 has been broken away in Fig. 2 to show its piston 74. The dash-pot pistons are attached to upwardly extending piston rods 76 and 77, which are connected by links 78 and 79 respectively with the lever 68 at opposite sides of the fulcrum shaft 67. The downward movement of each piston is retarded by means of a suitable check valve 81 connected to the lower end of the cylinder. Each check-valve preferably comprises a ball-valve 82 which is held slightly away from its seat by means of an adjustable screw 83. The ball-valves are arranged to open freely and allow oil to enter the cylinders without undue restriction. The two check valves 81 are connected by a horizontal pipe 85 to which there is connected a vertical pipe 86 having a vent cap 87 on its upper end. The vertical pipe is connected by horizontal pipes 88 with the upper portions of the dash-pot cylinders.

It will be apparent that movement of the lever 68 in either direction will result in downward movement of one dash-pot piston and upward movement of the other. Moreover, the downwardly-moving piston will be retarded by the action of the corresponding check-valve. The oil which is forced out of one cylinder will pass through the pipe 85 and enter the other cylinder. The vertical pipe 86 serves as a storage reservoir for extra oil, and any oil which may escape upwardly past the pistons will be returned to the system through the pipes 88. No stuffing boxes, with attendant friction, are required for the dash-pots, and no external oil leakage can occur.

In order to effect a readjustment of the lever 68 following each movement of the steam pressure regulator 38, I provide yieldable means to bias the lever in the proper direction during such time as is required to complete the desired readjustment and bring the lever to a predetermined position relative to the master regulator, the rate of movement of the lever being controlled by the dash-pots. For the yieldable means I prefer to use a weight mechanism, since such a construction will move the lever at a substantially uniform speed, which is ordinarily desirable. In the embodiment illustrated I have shown a weight 90 suspended from one end of the lever 68 and a weight 91 suspended from the other end. The two weights are so related with respect to size and distance from the fulcrum that the weight 91 will over-balance the weight 90. In the drawings the two weights are shown equally spaced from the fulcrum, the weight 91 being the heavier. It will be apparent that with both weights suspended from the lever, the lever will be biased in one direction, whereas if only the weight 90 is suspended the bias will be in the opposite direction.

Means is provided for controlling the bias of the lever 68 in accordance with movements of the steam pressure regulator 38. For this purpose the weight 91 is shown supported on a flange 93 secured to the lower end of a vertical pipe 94. The upper end of this pipe is provided with two oppositely extending pins or lugs 95 which engage spaced V-shaped hooks 96 formed on the lever 68. A vertical rod 98 extends centrally through the pipe 94 and is provided with nuts 99 and a washer 100 at its lower end, the washer normally serving to support the flange 93, pipe 94 and weight 91. The upper end of the rod 98 is connected to one end of a horizontal lever 102 (Fig. 1) having a fulcrum 103, this fulcrum preferably being located in the same vertical plane as the shaft 67. The other end of the lever 102 is connected by a link 104 with the steam pressure regulator 38.

The operation of the invention will now be apparent from the above disclosure. Under steady load conditions the steam pressure regulator 38 will hold the arm 40 in a stationary position to maintain a uniform feed of coarse fuel to the pulverizer. The regulator will also hold the rod 98 in a stationary position, with the weight 91 supported by the rod, and the hooks 96 held against the pins 95 by the action of the weight 90. With the lever 68 thus held stationary, the regulator 46 will control the damper 28 and maintain a definite air pressure in the duct 27 and a resultant definite air flow through the burner 16. The slightest change in the air pressure will be transmitted through the pipe 70 to the diaphragm 54, which will immediately actuate the pilot valve mechanism 47, motor 50, and damper 28 to restore the correct pressure.

If now the demand for heat should increase, as indicated by a drop in steam pressure, the regulator 38 will immediately readjust the arm 40 for an increased rate of feed to the pulverizer and at the same time it will swing the lever 102 and lower the rod 98. This will leave the weight 91 supported by the hooks 96 rather than by the washer 100, and the weight will therefore immediately start to move downwardly, turning the lever 68 and raising the weight 90. This movement of the lever 68 will be retarded by the dash-pot 73, the rate of movement being determined by the adjustment of the corresponding check-valve 81, so that the cam 66 will increase the tension of the spring 55 slowly. This increased spring tension will cause the pilot valve mechanism 47 to actuate the motor 50 and open the damper 28, thus increasing the pressure in the duct 27. The dash-pot is preferably so adjusted that the downward movement of the weight 91 will be arrested by the washer 100 at substantially the same instant as the increase in fuel feed at the pulverizer becomes fully effective at the burner. This results in the maintenance of a substantially correct fuel-air ratio throughout the load change.

When the demand for heat decreases, the steam pressure will rise, and the regulator 38 will immediately readjust the arm 40 for a decreased rate of feed to the pulverizer while at the same time swinging the lever 102 and raising the rod 98. This will raise the weight 91 and lift the pins 95 to a position above the hooks 96. The weight 90 will immediately move downwardly, turning the lever 68 at a speed controlled by the dash-pot 72 and its corresponding check-valve, and causing the cam 66 to decrease the tension of the spring 55. This will result in a slow movement of the damper 28 toward closed position, decreasing the air flow in the duct 27. The dash-pot 72 is preferably so adjusted that the upward movement of the hooks 96 will be arrested by the pins 95 at substantially the same instant as the decrease in fuel feed at the pulverizer becomes fully effective at the burner, thus avoiding undesirable variations in the fuel-air ratio.

Either an increase or a decrease in the combustion rate will necessitate a readjustment of the uptake damper 23 to prevent undesirable furnace pressure conditions. This will be cared for automatically by the regulator 30, which will at all times maintain a predetermined pressure in the furnace 10, preferably slightly below the pressure of the atmosphere.

With some types of pulverizers, when the fuel feed at the pulverizer is changed, there may be a change in fuel flow at the burner which is characterized by a varying rate of change. For example the rate of change may gradually decrease throughout the entire period necessary to complete the change. In such a case, I prefer to use the slightly modified construction illustrated in Fig. 4, in which the movement of the adjust-lever for the air pressure regulator is brought about by springs instead of weights. In this modified construction the lever 110 corresponds to the lever 68 of Fig. 2, and the rod 111 corresponds to the rod 98 of Fig. 2. A yoke 112 is secured to the rod 111, and this yoke supports a vertical rod 114 in alignment with the rod 111. The rod 114 is slidable through a block 115 which is pivotally attached to the lever 110, and compression springs 117 and 118 surround the rod 114 respectively above and below the block and in contact therewith. It will be apparent that vertical movement of the rod 111 in either direction (under the influence of the steam pressure regulator) will result in compressing one of the springs 117 or 118, and the compressed spring will gradually move the lever 110 to a new position, the movement being retarded by a dash-pot as in Fig. 2. Since the force exerted by the compressed spring will decrease as the movement of the lever progresses, the rate of change of the lever position and hence the rate of change of burner air flow will also decrease throughout the time required to complete the change. If the change in fuel-flow is similarly characterized, this construction will result in efficient combustion conditions throughout load variations.

From the above disclosure it will be apparent that the present invention provides a comparatively simple, inexpensive and reliable means for controlling the combustion of pulverized fuel. Unusually efficient combustion is made possible despite frequent and considerable changes in the demand for heat. By locating the retarding means at the adjustment of the air-flow regulator rather than at the motor for this regulator, I leave the regulator free to make substantially instantaneous adjustments of the damper 28 which may be necessitated by anything independent of load changes, such as changes in fan speed, number of fans in service, number of boilers receiving air from the main duct, etc. Since the motors for the non-compensating type regulators 30 and 46 can be located remote from the regulators, being connected thereto only by small tubing, the system is well adapted to a centralized arrangement of the regulators, all of which can be located behind a single instrument and control panel if desired. It is not necessary to maintain a constant air pressure in the main duct 26, and power will be saved without sacrifice in combustion efficiency if this pressure is reduced during periods of low demand by decreasing the fan speed or the number of fans in service. Since each dash-pot has a separate check-valve, it is possible to make independent adjustments of the retarding effect for increasing loads and for decreasing loads. These adjustments can be easily made to meet the particular conditions encountered at each installation.

Having thus described my invention, what I claim as new and desire to secure by Letters Patent is:

1. Fuel burning apparatus comprising a furnace, a pulverizer to deliver pulverized fuel thereto, a feeding device to supply coarse fuel to the pulverizer, means to control the feeding device in accordance with the demand for heat, a regulatable device to control the flow of air to the furnace, and a regulator to control the regulatable device, the regulator being arranged to respond rapidly to changes in air supply and slowly to changes in the demand for heat.

2. Fuel burning apparatus comprising a furnace, a pulverizer to deliver pulverized fuel thereto, a feeding device to supply coarse fuel to the pulverizer, means to control the feeding device in accordance with the demand for heat, means to supply air to the furnace, and a regulator to control the rate of air supply in accordance with the demand for heat, the regulator being arranged to respond rapidly to changes in air supply and slowly to changes in the demand for heat.

3. Fuel burning apparatus comprising a furnace, a pulverizer to deliver pulverized fuel thereto, a feeding device to supply coarse fuel to the pulverizer, a regulatable device to control the flow of air to the furnace, a regulator to control the regulatable device and tending to maintain an established air supply, and means to readjust both the feeding device and the regulator in accordance with changes in the demand for heat, the adjustments of the regulator being effected more slowly than the adjustments of the feeding device.

4. Fuel burning apparatus comprising a furnace, a pulverizer to deliver pulverized fuel thereto, a feeding device to supply coarse fuel to the pulverizer, means to control the feeding device in accordance with the demand for heat, a regulatable device to control the flow of air to the furnace, a regulator to control the regulatable device, the regulator being responsive to two forces one of which is a function of the rate of air supply, and the other of which is a function of the demand for heat, and means to cause the variations in the second force, following a change in the demand for heat, to be made slowly as compared with the corresponding variations in the feeding device.

5. Fuel burning apparatus comprising a furnace, a pulverizer to deliver pulverized fuel thereto, a feeding device to supply coarse fuel to the pulverizer, means to control the feeding device in accordance with the demand for heat, means to supply air to the furnace, a regulator to control the rate of air supply, the regulator being responsive to two forces one of which is a function of the rate of air supply and the other of which is a function of the demand for heat, and means to cause the second force to vary more slowly than the feeding device following a change in the demand for heat.

6. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a second regulator arranged to control the regulatable device and tending to maintain an established air supply, and means to readjust the second regulator and thus vary the established air supply to be maintained, said readjusting means being actuated in accordance with the movements of the master regulator but at a slower rate.

7. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, automatic means to control the motor and tending to maintain an established air supply, and means to readjust the automatic means and thus vary the established air supply to be maintained, said readjusting means being actuated in accordance with the movements of the master regulator but at a slower speed.

8. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, pressure responsive means to control the motor, said pressure responsive means being subjected to a fluid pressure which is a function of the rate of air supply, means providing a force which supports the pressure responsive means against the fluid pressure, and means to vary said force in accordance with the movements of the master regulator but at a slower speed.

9. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, pressure responsive means to control the motor, said pressure responsive means being subjected to a fluid pressure which is a function of the rate of air supply, a spring arranged to support the pressure responsive means in opposition to the fluid pressure, and means to adjust the spring in accordance with the movements of the master regulator but at a slower speed.

10. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, means including a flexible pressure responsive diaphragm to control the motor, said diaphragm being subjected to a fluid pressure which is a function of the rate of air supply, a spring arranged to support the diaphragm in opposition to the fluid pressure, and means to adjust the spring in accordance with the movements of the master regulator but at a slower speed.

11. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, automatic means to control the motor and tending to maintain an established air supply, an adjusting device for the automatic means whereby the established air supply to be maintained may be varied, yieldable means to move the adjusting device to a predetermined position relative to the master regulator following each movement thereof, and retarding means causing the adjusting device to move at a rate which is slow as compared with the movements of the master regulator.

12. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, automatic means to control the motor and tending to maintain an established air supply, an adjusting device for the automatic means whereby the established air supply to be maintained may be varied, yieldable means to move the adjusting device to a predetermined position relative to the master regulator following each movement thereof, and means including a dash-pot to retard the adjusting device and cause it to move at a rate which is slow as compared with the movements of the master regulator.

13. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, automatic means to control the motor and tending to maintain an established air supply, an adjusting device for the automatic means whereby the established air supply to be maintained may be varied, yieldable means to move the adjusting device to a predetermined position relative to the master regulator following each movement thereof, means to retard the movements of the adjusting device in each direction and thus cause the movements thereof to be slow as compared with the corresponding movements of the master regulator, and means for adjusting the amount of retarding independently in each direction.

14. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, automatic means to control the motor and tending to maintain an established air supply, an adjusting device for the automatic means whereby the established air supply to be maintained may be varied, yieldable means to move the adjusting device to a predetermined position relative to the master regulator following each movement thereof, two hydraulic dash-pots to retard the movements of the adjusting device in each direction and thus cause the movements thereof to be slow as compared with the corresponding movements of the master regulator, and means for adjusting the retarding effect of each dash-pot independently of the other.

15. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, automatic means to control the motor and tending to maintain an established air supply, an adjusting device for the automatic means whereby the established air supply to be maintained may be varied, means providing a lost motion connection between the master regulator and the adjusting device, yieldable means associated with the lost motion connection and tending to hold the adjusting device in a predetermined position relative to the master regulator, and retarding means causing the adjusting device to move at a rate which is slow as compared with the movements of the master regulator.

16. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, automatic means to control the motor and tending to maintain an established air supply, an adjusting device for the automatic means whereby the established air supply to be maintained may be varied, means providing a lost motion connection between the master regulator and the adjusting device, a weight associated with the lost motion connection and tending to hold the adjusting device in a predetermined position relative to the master regulator, and retarding means causing the adjusting device to move at a rate which is slow as compared with the movements of the master regulator.

17. Fuel burning apparatus comprising a furnace, a pulverizer to deliver pulverized fuel thereto, a feeding device to supply coarse fuel to the pulverizer, a regulatable device to control the flow of air to the furnace, a master regulator arranged to control the feeding device in accordance with the demand for heat, a motor to operate the regulatable device, automatic means to control the motor and tending to maintain an established air supply, an adjusting device for the automatic means whereby the established air supply to be maintained may be varied, means providing a lost motion connection between the master regulator and the adjusting device, a spring actuated mechanism associated with the lost motion connection and tending to hold the adjusting device in a predetermined position relative to the master regulator, and retarding means causing the adjusting device to move at a rate which is slow as compared with the movements of the master regulator.

ALBERT G. BLODGETT.